United States Patent
Esaki et al.

(10) Patent No.: US 11,989,467 B2
(45) Date of Patent: May 21, 2024

(54) IMAGE RECORDING DEVICE

(71) Applicant: BROTHER KOGYO KABUSHIKI KAISHA, Nagoya (JP)

(72) Inventors: Shinya Esaki, Nagoya (JP); Yushi Deura, Nagoya (JP); Haruka Azechi, Nagoya (JP); Tetsuya Okuno, Nagoya (JP); Shunsuke Minamikawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/563,747

(22) Filed: Dec. 28, 2021

(65) Prior Publication Data
US 2022/0121404 A1    Apr. 21, 2022

Related U.S. Application Data

(63) Continuation of application No. PCT/JP2020/023175, filed on Jun. 12, 2020.

(30) Foreign Application Priority Data

Jun. 28, 2019   (JP) ................. 2019-120836

(51) Int. Cl.
| | |
|---|---|
| *G06F 3/12* | (2006.01) |
| *B41J 2/175* | (2006.01) |
| *G06K 15/10* | (2006.01) |

(52) U.S. Cl.
CPC ........ *G06F 3/1229* (2013.01); *B41J 2/17546* (2013.01); *G06F 3/1204* (2013.01);
(Continued)

(58) Field of Classification Search
None
See application file for complete search history.

(56) References Cited

U.S. PATENT DOCUMENTS 5,355,159 A * 10/1994 Kaneko ................ H04N 1/2307
                                                           347/3
2001/0037267 A1   11/2001 Sato et al.
(Continued)

FOREIGN PATENT DOCUMENTS

| CN | 101612836 A | 12/2009 |
|---|---|---|
| CN | 104246685 A | 12/2014 |

(Continued)

OTHER PUBLICATIONS

International Preliminary Report on Patentability and Written Opinion together with English translation dated Dec. 28, 2021 from PCT/JP2020/023175.

(Continued)

*Primary Examiner* — Helen Zong
(74) *Attorney, Agent, or Firm* — Scully, Scott, Murphy & Presser, PC (57) ABSTRACT

An image recording device stores correspondence information associating a plurality of status information types, output determination information and request type information. The status information is related to at least one of information on a cartridge and information corresponding to operation of a printing head. The output determination information corresponds to usage type information. The request type information is used to determine a type of a person requesting the status information. A controller of the image recording device is configured to perform receiving an output request of output of the status information, determining a type of the request type information, and identifying the status information of which type is associated with the determined request type information and the output determination information based on the correspondence information from among a plurality of types of the status information.

9 Claims, 8 Drawing Sheets

(52) U.S. Cl.
CPC .......... *G06F 3/1253* (2013.01); *G06F 3/1286* (2013.01); *G06F 3/1288* (2013.01); *G06K 15/102* (2013.01)

(56) References Cited

U.S. PATENT DOCUMENTS

| | | | |
|---|---|---|---|
| 2002/0022990 A1* | 2/2002 | Kurata | B41J 2/17503 705/14.36 |
| 2003/0184624 A1* | 10/2003 | Kinalski | G03G 15/0894 347/86 |
| 2004/0181681 A1* | 9/2004 | Salisbury | G06F 21/84 713/170 |
| 2007/0097161 A1 | 5/2007 | Ejiri et al. | |
| 2010/0141705 A1* | 6/2010 | Jimenez | B41J 2/1721 347/31 |
| 2011/0020781 A1* | 1/2011 | Yang | G06Q 50/20 434/350 |
| 2011/0175955 A1 | 7/2011 | Ejiri et al. | |
| 2012/0194581 A1 | 8/2012 | Shindo | |
| 2013/0314461 A1 | 11/2013 | Ejiri et al. | |
| 2015/0070416 A1 | 3/2015 | Ejiri et al. | |
| 2015/0336393 A1 | 11/2015 | Ejiri et al. | |
| 2016/0221352 A1 | 8/2016 | Ejiri et al. | |
| 2017/0064093 A1* | 3/2017 | Shishido | G06Q 10/087 |
| 2019/0155188 A1* | 5/2019 | Shimomura | G03G 15/5058 |
| 2020/0120232 A1* | 4/2020 | Sasaki | H04N 1/32529 |
| 2020/0398579 A1* | 12/2020 | Gardner | B33Y 50/00 |
| 2021/0031534 A1* | 2/2021 | Butinya | B41J 2/17503 |
| 2021/0096493 A1* | 4/2021 | Kyotani | G03G 15/553 |
| 2021/0238434 A1* | 8/2021 | Kozee | C09D 11/36 |
| 2021/0302889 A1* | 9/2021 | Kyotani | G03G 21/1889 |
| 2021/0354474 A1* | 11/2021 | Gong | B41J 2/17513 |

FOREIGN PATENT DOCUMENTS

| | | |
|---|---|---|
| EP | 2 851 784 A1 | 3/2015 |
| JP | 2002-211087 A | 7/2002 |
| JP | 2004-46615 A | 2/2004 |
| JP | 2004-151703 A | 5/2004 |
| JP | 2005-301126 A | 10/2005 |
| JP | 2008-227914 A | 9/2008 |
| JP | 2009-298051 A | 12/2009 |
| JP | 2011-152794 A | 8/2011 |
| JP | 2013-182437 A | 9/2013 |
| JP | 2015-208990 A | 11/2015 |
| JP | 2018-114626 A | 7/2018 |

OTHER PUBLICATIONS

International Search Report dated Jul. 28, 2020 received in International Application No. PCT/JP2020/023175, 7 pages.
Extended European Search Report dated May 24, 2023 from related European Patent Application EP No. 20 83 2053.1.
Official Action dated Nov. 28, 2022 received from the China National Intellectual Property Administration in related application CN 202080047909.6 together with English language translation.
Notice of Reasons for Refusal dated Aug. 8, 2023 issued in the JP counterpart application No. 2019-120836 together with English language translation.

* cited by examiner

CORRESPONDENCE TABLE

| NUMBER | STATUS INFORMATION TYPE | TYPE 1 REQUEST (USER) | | TYPE 2 REQUEST (ADMINISTRATOR) | | TYPE 3 REQUEST (SERVICE PROVIDER) | |
|---|---|---|---|---|---|---|---|
| | | FIRST MODE | SECOND MODE | FIRST MODE | SECOND MODE | FIRST MODE | SECOND MODE |
| 1 | PRINTER INFORMATION | 1 | 1 | 1 | 1 | 1 | 1 |
| 2 | CTG LIFETIME INFORMATION | 0 | 1 | 1 | 1 | 1 | 1 |
| 3 | PAD LIFETIME INFORMATION | 0 | 0 | 1 | 0 | 1 | 0 |
| 4 | CTG COVERAGE INFORMATION | 0 | 0 | 1 | 0 | 1 | 0 |
| 5 | PAGE COUNT INFORMATION | 0 | 1 | 1 | 1 | 1 | 0 |
| 6 | CTG SERIAL NUMBER | 1 | 1 | 1 | 1 | 1 | 1 |
| 7 | MAIN BODY SERIAL NUMBER | 0 | 0 | 0 | 0 | 1 | 1 |
| 8 | NUMBER OF CTG REPLACEMENT | 0 | 0 | 1 | 0 | 1 | 0 |
| ... | ... | | | ... | | | |

FIG. 4

| | | | NOTIFICATION OPTIONS 1 | NOTIFICATION OPTIONS 2 |
|---|---|---|:---:|:---:|
| EXPORT | | | | |
| PRINTER INFORMATION | | | ☑ | ☑ |
|   MODEL NAME | | MFC-A | ☑ | ☑ |
|   MAIN BODY SERIAL NUMBER | | 0123456 | ☑ | ☑ |
|   FIRMWARE Ver. | | E | ☐ | ☐ |
| PRINTER CONDITION | | | ☑ | ☑ |
|   PAGE COUNT INFORMATION | | 683 | ☑ | ☑ |
|     COLOR | | 273 | ☑ | ☑ |
|     MONOCHROMATIC | | 410 | ☑ | ☑ |
|   CTG COVERAGE INFORMATION | | | ☑ | ☑ |
|     CYAN | | 1.61 | ☑ | ☑ |
|     ⋮ | | | | |
|   CTG LIFETIME INFORMATION | | | ☐ | ☐ |
|     CYAN | | 5% | ☐ | ☐ |
|     ⋮ | | | | |
| SHEET COUNT PER SHEET SIZE | | | ☑ | ☑ |
|   A3/LEGAL | | 2 PAGES | ☑ | ☑ |
|   A4/LETTER | | 681 PAGES | ☑ | ☑ |
|   POSTCARD | | 0 PAGES | ☐ | ☐ |
|   OTHERS | | 0 PAGES | ☐ | ☐ |
| SHEET COUNT PER PAPER TYPE | | | ☑ | ☑ |
|   PLAIN PAPER | | 680 PAGES | ☑ | ☑ |
|   INKJET PAPER | | 0 PAGES | ☑ | ☑ |
|   GLOSSY PAPER | | 3 PAGES | ☑ | ☑ |
| TOTAL NUMBER OF PRINTS | | | ☑ | ☑ |
|   TOTAL | | 683 PAGES | ☑ | ☑ |
|     COLOR | | 273 PAGES | ☑ | ☑ |
|     MONOCHROMATIC | | 410 PAGES | ☑ | ☑ |
|     BOTH-SIDED | | 0 PAGES | ☑ | ☑ |
|   ⋮ | | | | |
|   COPY | | 139 PAGES | ☑ | ☑ |
|     COLOR | | 35 PAGES | ☑ | ☑ |
|     MONOCHROMATIC | | 104 PAGES | ☑ | ☑ |
|     BOTH-SIDED | | 0 PAGES | ☐ | ☐ |
|   ⋮ | | | | |
| ⋮ | | | | |

IMAGE RECORDING DEVICE

CROSS-REFERENCE TO RELATED APPLICATIONS

This is a Continuation application of International Application No. PCT/JP2020/023175 filed on Jun. 12, 2020, which claims priority from Japanese Patent Application No. 2019-120836 filed on Jun. 28, 2019. The entire disclosures of the prior applications are incorporated herein by reference.

BACKGROUND

The present disclosure relates to an image recording device configured to output status information.

Known image recording devices may be used with mounted cartridges that store consumables such as ink or toner. Some image recording devices may be configured to, in response to a request from a terminal device such as a personal computer, transmit to the terminal device status information, such as a remaining amount of consumable materials such as ink or toner stored in the mounted cartridge.

A user of the image recording device may use the image recording device with a contract with a service provider in a contracted usage mode. A user may also use the image recording device without a contract with a service provider in a normal usage mode. The service provider provides consumables, such as cartridges for use in the image recording device, to the user based on the contract in the contracted usage mode.

SUMMARY

According to aspects of the present disclosure, an image recording device includes a mounting part to which a cartridge is mounted, a printing head configured to perform printing on a sheet, a cartridge interface, an information interface, a memory and a controller. The memory can store correspondence information associating a plurality of types of status information, output determination information and request type information with each other. The status information is information related to at least one of information on the cartridge mounted to the mounting part and information corresponding to operation of the head, and the status information is information to be stored in the memory by the controller. The output determination information is information corresponding to usage type information obtained from a cartridge memory through the cartridge interface, and the cartridge memory is provided to the cartridge mounted to the mounting part. The request type information is information used to determine a type of a person requesting the status information. The controller can perform receiving an output request that requests output of the status information, determining a type of the request type information based on the received output request, and identifying the status information of which type is associated with the determined request type information and the output determination information corresponding to the obtained usage type information. The status information is identified based on the correspondence information from among a plurality of the status information types stored in the memory.

DESCRIPTION OF THE EMBODIMENT

Hereinafter, an embodiment according to aspects of the present disclosures will be described. It should be noted that the embodiment described below is only one example of the embodiment, and that the embodiment according to aspects of the present disclosures can be modified as necessary to the extent that the intent of aspects of the present disclosures is not changed. For example, an order of execution of each of the processes described later may be changed as appropriate to the extent that the intent of aspects of the present disclosures is not changed. Alternatively, some of the processes described later may be omitted as appropriate to the extent that the omission does not change the intent of aspects of the present disclosures.

Figure 1:
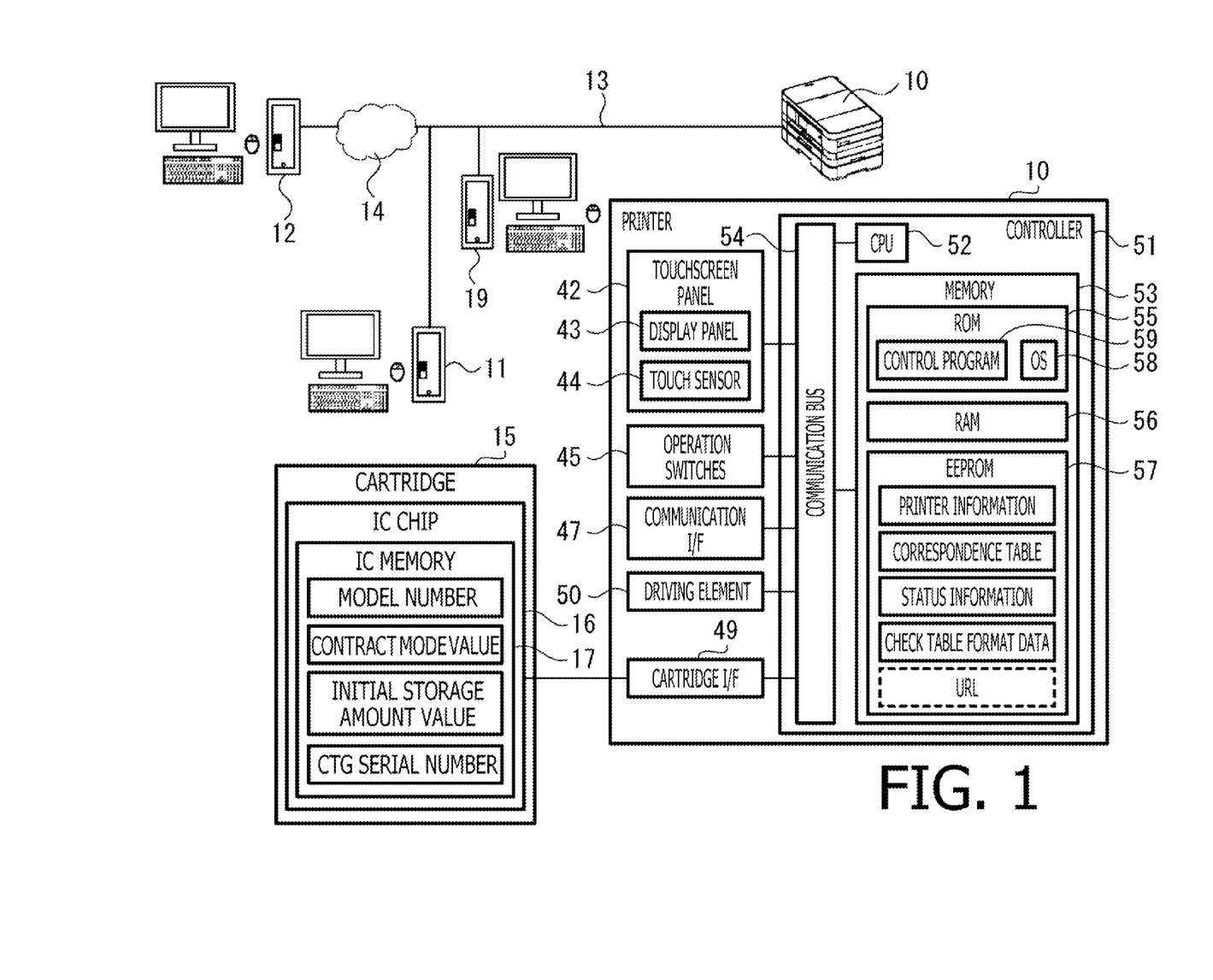
FIG. 1 is a functional block diagram of a printer.

In the present embodiment, as shown in FIG. 1, a printer 10 connected to a local network 13 such as a LAN will be described. The printer 10 is configured to receive recording instructions from a terminal device 19 or a management device 11 connected to the local network 13, and record image data contained in the recording instructions onto a sheet. The terminal device 19 or the management device 11 may be, but not limited to, a personal computer, a tablet, a smartphone, or any kind of terminal. When the terminal device 19 or the management device 11 is a tablet or a smartphone, the terminal device 19 or the management device 11 may wirelessly transmit the recording instructions to the printer 10 through an access point provided in the local network 13. Hereinafter, the terminal device 19 is defined as a device used by a user of the printer 10. The management device 11 is defined as a device used by an administrator of the printer 10.

The user of the printer 10 may use the printer 10 with a contract with a service provider in a contracted usage mode. A user may also use printer 10 without a contract with a service provider in a normal usage mode. The service provider is a person or an entity providing the user of the printer 10 with cartridges 15 to be used in the printer 10. The service provider may also provide their service to the user of the printer 10, using a server 12 connected to the Internet 14. For example, the server 12 may receive, via the Internet 14, status information transmitted from the printer 10. The status information may indicate remaining amount of ink in the cartridges 15 (hereinafter, the ink remaining amount) such that the service provider may monitor the ink remaining amount based on the status information that the server 12 receives. When the service provider determines that the ink remaining amount is low, the service provider arranges a shipment of a new cartridge 15 to the user of the printer 10. The server 12 is an example of an information processing device.

The printer 10 has a function of transmitting status information in response to a request from the management device 11 or the server 12. The printer 10 also has a function of determining the status information type to be transmitted according to requester information. The requester information indicates the type of requester, who requests the status information, that includes an administrator who manages the printer 10, a user who uses the printer 10, or a service provider as described above.

The local network 13, which is connected to the printer 10, is connected to the Internet 14 via a gateway device such as a router. The printer 10 is configured to communicate with the server 12 through the local network 13 and the Internet 14, using communication protocols such as HTTP or HTTPs. The printer 10 is configured to transmit an HTTP request to a URL of the server 12. The server 12 may receive the HTTP request transmitted from the printer 10, and may transmit a response to the received HTTP request to the printer 10 through the Internet 14.

Figure 2A:
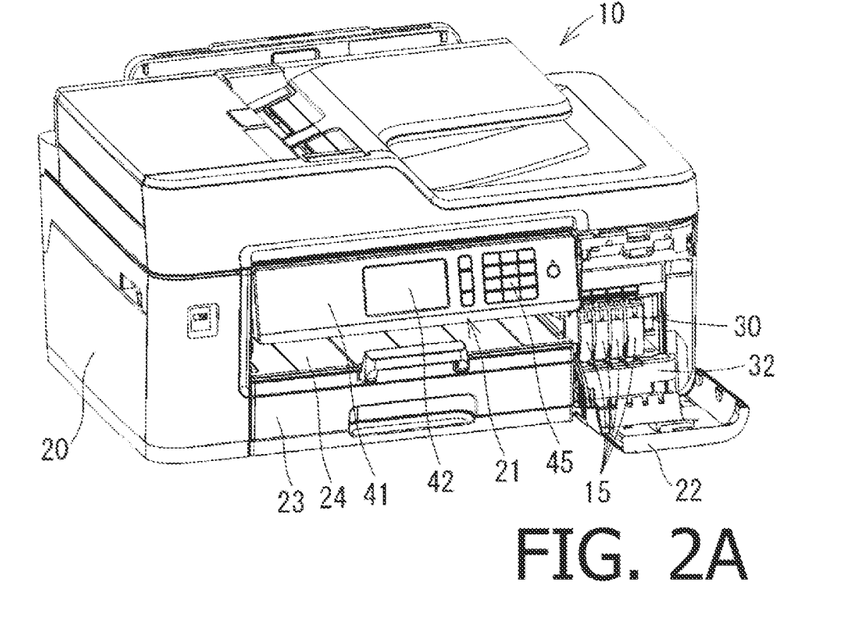
FIG. 2A is a perspective view of the printer 10 in a state where a cover is opened.

As shown in FIG. 2A, the printer 10 has a housing 20. The printer 10 also has a panel unit 21, a cover 22, a sheet feed tray 23, and a sheet discharge tray 24, each held in the housing 20.

The panel unit 21 has a panel body 41, a touchscreen panel 42 and multiple operation switches 45, each held on the panel body 41. The panel body 41 is a rectangular plate and is attached to one surface of the housing 20. The touchscreen panel 42 has a display panel 43 to display images and a transparent film-like touch sensor 44 overlaid on the display panel 43, as shown in FIG. 1. The touch sensor 44 is configured to output position information indicating a position where the user touches on the display panel 43.

The display panel 43, the touch sensor 44, and the operation switches 45 are connected to a controller 51, which is described later, by wires. The controller 51 is configured to output image data to the display panel 43, thereby displaying an image on the display panel 43. In addition, the controller 51 is configured to receive the position information output from the touch sensor 44. The controller 51 is configured to determine that the object, such as an icon, that is displayed at the position indicated by the position information is the object designated by the user. In addition, the controller 51 is configured to receive an operation signal output by the operation switches 45. The touch sensor 44 and the operation switches 45 are examples of a user interface.

The sheet feed tray 23 is arranged at a lower part of the housing 20, as shown in FIG. 2A, and is removably held by the housing 20. The sheet discharge tray 24 is arranged at a lower part of the housing 20 and above the sheet feed tray 23, and is held by the sheet feed tray 23 or the housing 20. The cover 22 is arranged at a front part of the housing 20 and is rotatably held by the housing 20. The cover 22 is configured to rotate between a closed position, at which the cover 22 closes an opening 30 formed on a front surface of the housing 20, and an open position shown in FIG. 2A, at which the cover 22 uncovers the opening 30. A mounting case 32 is arranged at a portion behind the opening 30 and is held in the housing 20. The mounting case 32 has a well-known configuration for removably holding the cartridge 15. The mounting case 32 is an example of a mounting part.

The mounting case 32 is configured to removably receive and hold a plurality of cartridges 15. As shown in FIG. 2A, the mounting case 32 removably holds four cartridges 15. Each of the cartridges 15 may store ink in one of four colors, respectively. The four colors may include magenta, cyan, yellow, and black. Thus, the printer 10 is a so-called color inkjet printer. The printer may be a monochrome inkjet printer, in which the mounting case 32 is configured to removably receive and hold one cartridge 15 storing black ink. The printer 10 may be a laser printer in which the mounting case 32 is configured to removably receive and hold one or more cartridges 15 storing toner.

Figure 3:
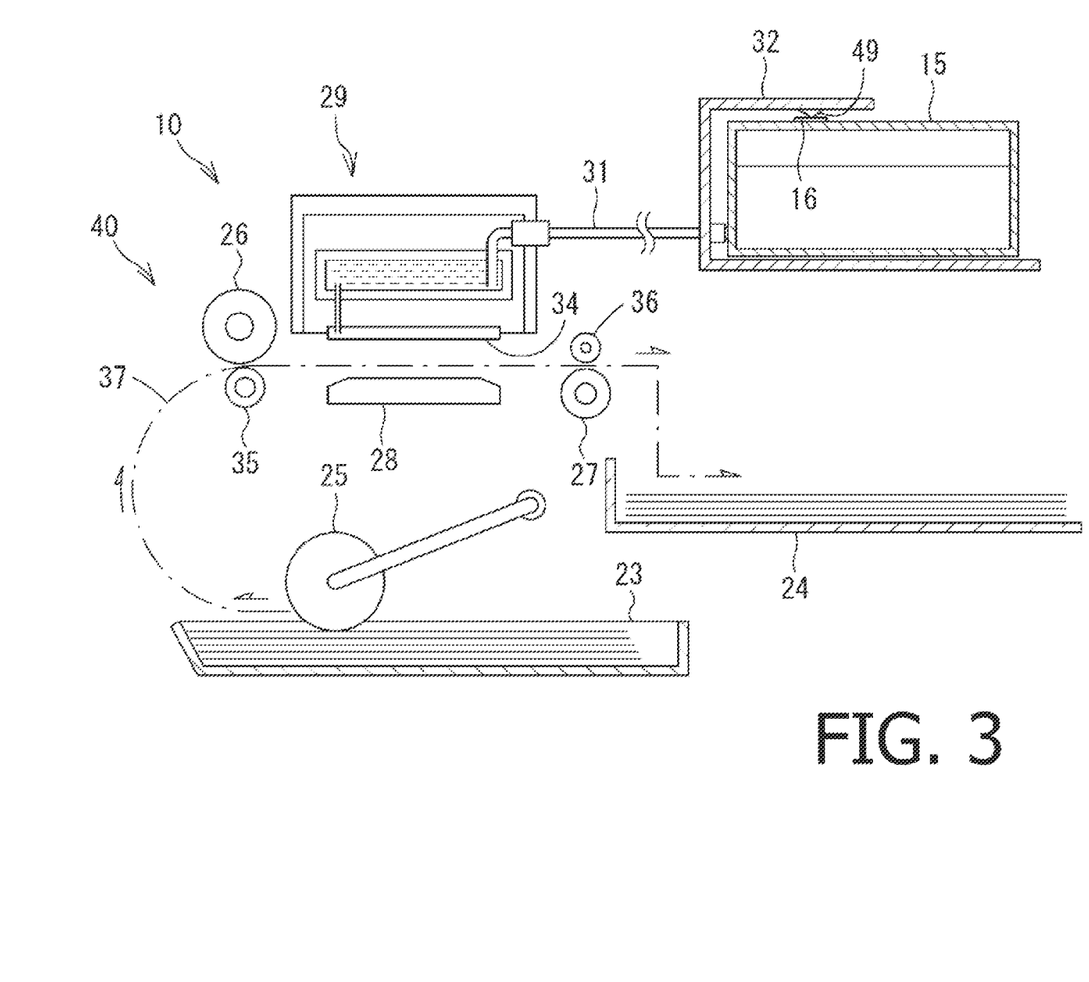
FIG. 3 is a schematic cross-sectional view of the printer.

The mounting case 32 has a cartridge interface (I/F) 49 shown in FIG. 3. The cartridge IF 49 may be an electric terminal. The cartridge IF 49 is arranged at a position where the cartridge I/F 49 is in contact with an electrode of an 1C chip 16 of the cartridge 15 mounted in the mounting case 32. The cartridge I/F 49 is connected to the controller 51 by wires. The cartridge I/F 49 may be an antenna to receive radio wave from the IC chip 16. The IC chip 16 may be one of a light emitting diode or a photodiode, and the cartridge I/F 49 may be the other such that light may be transmitted between the cartridge I/F 49 and the IC chip 16.

The cartridge 15 includes an internal space for storing ink therein. The ink is an example of a consumable material. The cartridge 15 includes the IC chip 16. The IC chip 16 has an electrode and an IC memory 17 shown in FIG. 1 electrically connected to the electrode. The electrode of the IC chip 16 may be in contact with the cartridge I/F 49 while the cartridge 15 is held in the mounting case 32. The IC chip 16 may have, instead of the electrode, an antenna or a light emitting diode and a photodiode. The IC memory 17 is configured to store various types of information. The IC memory 17 may store at least a model number, contract mode value, an initial storage amount value, and a CTG serial number, as shown in FIG. 1. The "CTG" is an abbreviation for a term "Cartridge." The IC memory 17 is an example of a cartridge memory. The CTG serial number is an example of cartridge identification information.

The model number is the identification information assigned to the cartridge 15 according to the color of the ink stored in the cartridge 15 and/or the type of the ink, such as dye or pigment. The contract mode value indicates whether the cartridge 15 is for use in a contracted usage mode or in a normal usage mode. The contract mode value may be a one-bit data that indicates "0" or "1" stored in a particular address in the IC memory 17. The contract mode value "1" indicates that the cartridge is for use in the contracted usage mode. The contract mode value "0" indicates that the cartridge is for use in the normal usage mode. Alternatively, the contract mode value may be a part of the model number. That is, a model number may indicate the color and type of the ink and cartridge is for use in the normal usage mode or the contracted usage mode.

The initial storage amount value indicates the initial amount of ink stored in the cartridge 15. The initial storage amount value is used when the controller 51 calculates the ink remaining amount in the cartridge 15. The CTG serial number is a number that individually identifies the cartridge 15.

As shown in FIG. 3, the housing 20 holds a recording engine 40 therein. The recording engine 40 includes a sheet feed roller 25, a conveying roller 26, a sheet discharging roller 27, a platen 28, a recording unit 29, a maintenance device 60 shown in FIG. 2B, and a frame. The recording unit 29 is an example of a recording part. The sheet feed roller 25 is held by the frame so as to contact a sheet on the sheet feed tray 23. The sheet feed roller 25 is rotatable by a motor. The rotating sheet feed roller 25 may feed a sheet into a conveyance path 37. The conveyance path 37 is a space defined by a guide member. As shown in FIG. 3, the conveyance path 37 extends in a curved manner from the rear end of the sheet feed tray 23 to a position above the sheet feed tray 23, and then extends forward.

The conveying roller 26 is arranged downstream of the sheet feed tray 23 in a sheet conveying direction. The conveying roller 26, together with a driven roller 35, constitutes a roller pair. The conveying roller 26 is rotatable by a motor. The rotating conveying roller 26 and the driven roller 35 may hold and convey a sheet fed into the conveyance path 37. The sheet discharging roller 27 is arranged downstream of the conveying roller 26 in the sheet conveying direction. The sheet discharging roller 27, together with a driven roller 36, constitutes a roller pair. The sheet discharging roller 27 is rotatable by a motor. The rotating sheet discharging roller 27 and the driven roller 36 may hold and convey a sheet to the sheet discharge tray 24. The platen 28 is arranged downstream of the conveying roller 26 and upstream of the sheet discharging roller 27 in the sheet conveying direction.

The recording unit 29 is arranged above the platen 28. The recording unit 29 may be movably held by guide rails that are part of the frame so the printer 10 may be a so-called serial printer. The recording unit 29 may alternatively be fixed to the frame so the printer 10 may be a so-called line printer. Further, the recording unit 29 has an inkjet head 34. The inkjet head 34 has a flow channel. The flow channel communicates with the internal space of the cartridge 15 mounted in the mounting case 32 via a tube 31 such that the ink in the cartridge 15 is supplied to the flow channel of the inkjet head 34 via the tube 31.

The inkjet head 34 has a driving element 50 shown in FIG. 1. A portion of the driving element 50 may be the flow channel. The driving element 50 is electrically connected to the controller 51 by wires. The driving element 50 may be a piezoelectric element or a heater. As a DC voltage is supplied to the piezoelectric element, the piezoelectric element may deform to apply pressure to the ink in the flow channel, thereby an ink droplet being ejected from a nozzle, which is an end of the channel. As a DC voltage is supplied to the heater, the heater may generate heat to cause the ink in the flow channel to boil, thereby an ink droplet being ejected from a nozzle.

Figure 2B:
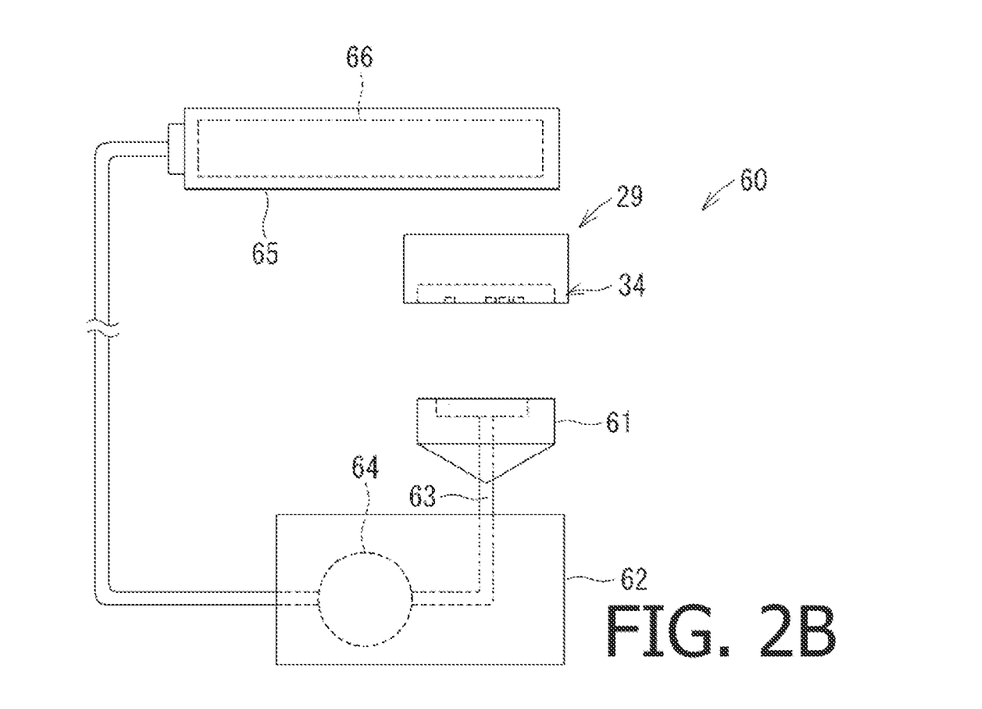
FIG. 2B is a schematic front view of a maintenance device.

A maintenance device 60 shown in FIG. 2B has the function of suctioning the ink from the nozzles of the inkjet head 34. The maintenance device 60 cleans the inkjet head 34 by suctioning high viscous ink, ink mixed with air, and dust adhering to the inkjet head 34.

The maintenance device 60 includes a cap 61, a lift-up mechanism 62, a tube 63, a pump 64, a drainage tank 65, and a pad 66. The cap 61 is movably held at the lift-up mechanism 62 such that the cap 61 is movable between a cap position, at which the cap 61 contacts a lower surface of the inkjet head 34 and covers the nozzles, and a standby position, at which the cap 61 is separated from the lower surface of the inkjet head 34. The cap 61 is movable between the cap position and the standby position by a motor. When the cap 61 is located at the cap position, driving the pump 64 causes ink to be suctioned from the nozzles of the inkjet head 34. The suctioned ink may be discharged through the tube 63 into the drainage tank 65. The pad 66 is in the drainage tank 65 to absorb the suctioned ink. The maintenance device 60 shown in FIG. 2B may collectively suction black ink, cyan ink, magenta ink, and yellow ink together. The maintenance device 60 may alternatively be configured to separately suction black ink and colored ink such as cyan ink, magenta ink, and yellow ink.

As shown in FIG. 1, the printer 10 includes a controller 51. The controller 51 includes a CPU 52, a memory 53, and a communication bus 54. The CPU 52, the memory 53, the touchscreen panel 42, the operation switches 45, a communication I/F 47, the driving element 50, and the cartridge I/F 49 are connected to the communication bus 54 so that information and data can be exchanged. The communication I/F 47 is an example of an information interface.

The memory 53 has a ROM 55, a RAM 56, and an EEPROM 57. The ROM 55 stores, in advance, an OS 58, and a control program 59. Instructions described in the OS 58 and the control program 59 are executed by the CPU 52. The OS 58 and the control program 59 may include instructions to display images on the display panel 43 and receive user inputs through the touch sensor 44 and/or the operation switches 45. The OS 58 and the control program 59 may further include instructions to transmit and receive information and/or data through the communication I/F 47 and the cartridge I/F 49. The OS 58 and the control program 59 may further include instructions to output drive signals to the driving element 50 to record images on the sheet.

The control program 59 may be a single program or a program including multiple modules, such as, a User Interface module (UI module), a communication module, and a recording control module. The multiple modules are executed in a pseudo-parallel manner by so-called multitasking.

The UI module is a program for supplying image data to the display panel 43 to display images containing objects such as icons on the display panel 43, and receives signals output from the touch sensor 44 and/or the operation switches 45. The communication module is a program for transmitting and receiving information and data according to a communication protocol of a communication line to which the communication I/F 47 is connected. The recording control module is a program for generating and outputting drive signals to the drive, based on the print data, circuits that drive the motors and the driving element 50.

The RAM 56 is configured to temporarily store information and/or data in executing the OS 58 and the control program 59. The EEPROM 57 is configured to store printer information including a main body serial number and a model name, a correspondence table, a plurality of types of status information, and check table format data. Further, the EEPROM 57 of the printer 10 in the contracted usage mode stores a URL of the server 12. The correspondence table is an example of correspondence information. The main body serial number is an example of main body identification information.

Figure 4:
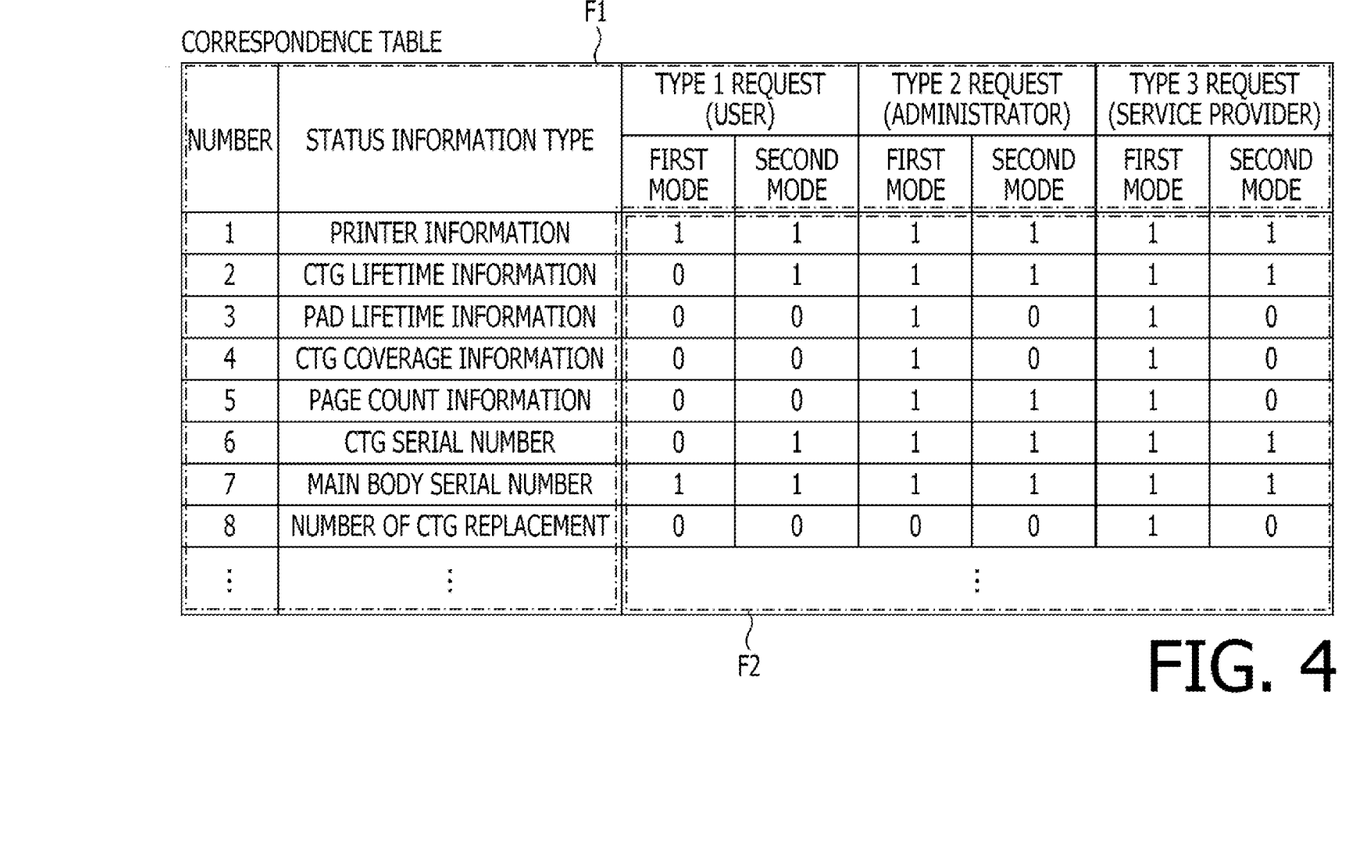
FIG. 4 shows a correspondence table.

The correspondence table has items of "number," "status information type," "type 1 request (user)," "type 2 request (administrator)," and "type 3 request (service provider)", stored in first fields F1 of the corresponding table as shown in FIG. 4. Further, each of the items of "type 1 request (user)," "type 2 request (administrator)," and "type 3 request (service provider)" has sub-items of "first mode" and second mode.", stored also in the first fields F1 of the corresponding table as shown in FIG. 4. The "first mode" indicates that the printer 10 is used in the contracted usage mode. The "second mode" indicates that the printer 10 is used in the normal usage mode. The "type 1 request (user)," "type 2 request (administrator)" and "type 3 request (service provider)" are examples of the request type information and the requester information. The "first mode" and "second mode" are examples of output determination information and contract mode information. That is, in the correspondence table, multiple types of status information are associated with request type information and output determination information.

The status information type is stored in EEPROM 57 in the field of the item "status information type." In the following description, storing information in the EEPROM 57 in the field of the correspondence table may have the same meaning as "registration in the field" or "registration in the correspondence table." As shown in FIG. 4, "printer information," "CTG lifetime information," "pad lifetime information," "CTG coverage information," "page count information," "CTG serial number," "main body serial number," and "number of CTG replacement" are registered in the fields of the item "status information type."

The "printer information" is a Management Information Base (MIB) stored in the EEPROM 57, and indicates information including the model name and the main body serial number. The "printer information" is the status information stored in the EEPROM 57 in advance. It is noted that the "printer information" may include information, which is stored in the EEPROM 57 after the printer 10 has been installed. One example of such information is a private IP address that the gateway device in the local network 13 has assigned to the printer 10.

The "CTG lifetime information" indicates a lifetime of the cartridge 15. The "CTG lifetime information" is determined by the controller 51 and stored in the EEPROM 57. The controller 51 is configured to count the number of times, that is a dot count value, the driving element 50 is driven. The controller 51 is configured to calculate the ink remaining amount in the cartridge 15 mounted in the mounting case 32 by subtracting the dot count value from the initial storage amount value read from the IC memory 17 through the cartridge I/F 49. The EEPROM 57 stores in advance a table in which a value of the ink remaining amount and a value of the lifetime are associated with each other. The controller 51 is configured to identify the lifetime corresponding to the calculated ink remaining amount in the table, and is configured to store the identified lifetime in the EEPROM 57 as the CTG lifetime. The calculation of the ink remaining amount in the cartridge 15 and the determination of the CTG lifetime, which are described above, is one example. The ink remaining amount and/or the CTG lifetime may be determined in other methods. The CTG lifetime information is an example of cartridge lifetime information.

The "pad lifetime information" indicates a lifetime of the pad 66. The "pad lifetime information" is determined by the controller 51 and stored in the EEPROM 57. The controller 51 is configured to calculate the amount of ink that the pump 64 has suctioned from the nozzles of the inkjet head 34, which is the amount of drainage, based on how many times the pump 64 of the maintenance device 60 has been driven and/or how long the pump 64 has been driven. The EEPROM 57 stores in advance a table in which the amount of drainage and the lifetime are associated with each other. The controller 51 is configured to identify the lifetime based on the calculated amount of drainage and stores the identified lifetime in the EEPROM 57 as pad lifetime information. The pad lifetime may be determined in other methods.

The "CTG coverage information" indicates an occupancy rate of the ink stored in each cartridge 15 mounted in the mounting case 32. The "CTG coverage information" is calculated by the controller 51 and stored in the EEPROM 57. The "CTG coverage information" may indicate average percentage of the occupancy rate of the ejected ink on each sheet. If black ink is ejected on the entire surface of a single sheet in a particular size, (e.g., A4 or Letter), the CTG coverage information is 100%. Therefore, if black ink is ejected in the half area of a single sheet, the CTG coverage information of the black ink is 50%. The controller 51 is configured to calculate the CTG coverage information for each recorded sheet, and based on the calculated CTG coverage information for each recorded sheet, calculate average CTG coverage information for all recorded sheets. For example, when black ink is ejected in the half area of a first sheet, the CTG coverage information of black ink is 50%. Then, when black ink is ejected in the one-quarter area of a second sheet, the CTG coverage information of black ink is 25%. Therefore, the average CTG coverage information of black ink when completed printing images on the first and second sheets is (50+25)/2=37.5%.

The "page count information" indicates the number of sheets recorded by the recording engine 40. The controller 51 is configured to count the number of sheets on which the recording engine 40 has recorded images, and store the counted number of sheets as the page count information in the EEPROM 57.

The "CTG serial number" indicates the CTG serial number of the cartridge 15 mounted in the mounting case 32. The controller 51 is configured to read the CTG serial number from the IC memory 17 through the cartridge I/F 49 and store the read CTG serial number in the EEPROM 57. The "main body serial number" indicates the main body serial number of the printer 10 stored in the EEPROM 57 in advance.

The "number of CTG replacement" indicates the number of times the cartridge 15 has been replaced, which is counted by the controller 51 and stored in the EEPROM 57. The "number of CTG replacement" is an example of replacement count information. The controller 51 is configured to read the CTG serial number from the IC memory 17 through the cartridge I/F 49 and determine whether or not the read CTG serial number matches the CTG serial number stored in the EEPROM 57. When the read CTG serial number does not match the CTG serial number stored in the EEPROM 57, the controller 51 determines that the cartridge 15 has been replaced, and increments the number of CTG replacement by one and stores the incremented number of CTG replacement in the EEPROM 57. It is noted that the status information of other types may be registered in the correspondence table. Examples of status information of such other types may be "sheet jam," which indicates that a sheet jam has occurred in the recording engine 40, "near empty," which indicates that the amount of ink stored in the cartridge 15 is low, and "ink empty," which indicates that enough ink to record an image on the sheet is not stored in the cartridge 15. It is also noted that all of the status information types described above may not necessarily be registered in the correspondence table.

It is noted that the "CTG lifetime information," the "CTG coverage information," the "CTG serial number," and the "number of CTG replacement" are examples of "information on the cartridge." Further, t the "page count Information" is an example of "information corresponding to operation of the head." The "pad lifetime information" is an example of condition information.

The correspondence table has a plurality of records each of which contains one of the status information types described above. Each record is identified by a number such as "1" and "2" registered in the field corresponding to the item "Number." In each record, an information output value of "1" or "0" is registered in each second field (F2) of the corresponding table corresponding to two sub-items of "type 1 request (user)," each second field (F2) corresponding to two sub-items of "type 2 request (administrator)," and each second field (F2) corresponding to two sub-items of "type 3 request (service provider)," respectively. The status information of the status information type having the information output value "1" is to be output. The status information of the corresponding status information type having the information output value "0" is not to be output.

As shown in FIG. 4, in a record containing the status information type of "CTG lifetime information" identified by the number "2", the information output value "0" is registered in the field corresponding to the sub-item "first mode" of "type 1 request (user)." In addition, the information output value "1" is registered in the field corresponding to the sub-item "second mode" of "type 1 request (user)." That is, whether or not the status information type "CTG lifetime information" is to be output varies depending on whether the printer 10 is used in the first mode, i.e., the contracted usage mode, or in the second mode, i.e., the normal usage mode, when the requester is the user of the printer 10. In a record containing the status information type of "CTG lifetime information" identified by the number "2", the information output value "1" is registered in the field corresponding to the sub-item "first mode" of "type 2 request (administrator)." In addition, the information output value "0" is registered in the field corresponding to the sub-item "first mode" of "type 1 request (user)." That is, whether or not the status information type "CTG lifetime information" is to be output varies depending on whether the requester is the user or the administrator, when the printer 10 is used in the first mode, i.e., the contracted usage mode. Similarly, depending on whether the printer 10 is used in the first mode or the second mode, and whether the requester is the user or the administrator, it is determined whether each of the status information types of "pad lifetime information," the "CTG coverage information," the "page count information," and the "CTG serial number" is to be output or not.

Figure 5:
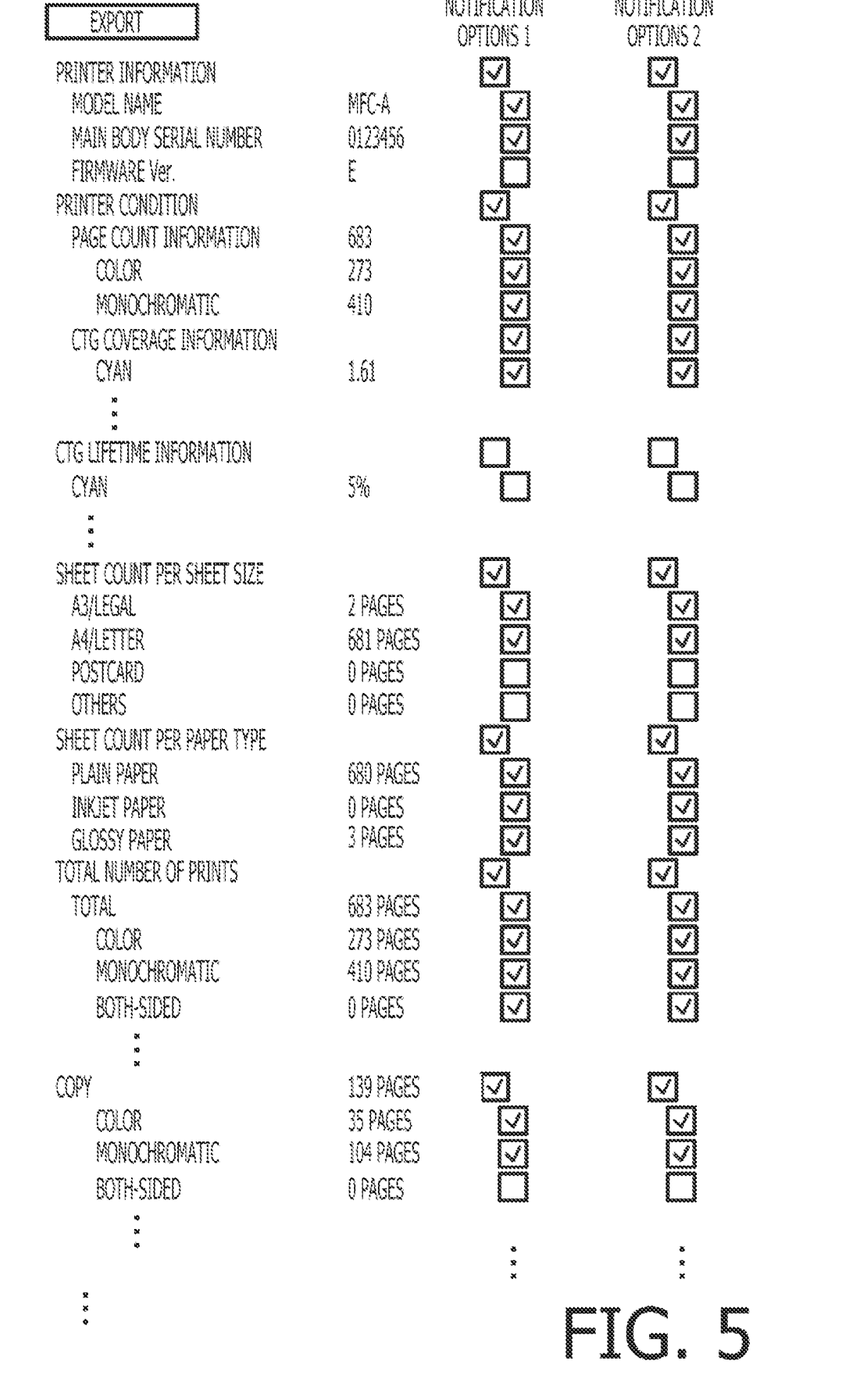
FIG. 5 shows a check table.

The check table format data, stored in the EEPROM 57, is used to generate check table image data indicating a check table shown in FIG. 5. The check table image data is in HTML or XML format and to be transmitted to the management device 11 or the server 12 through the local network 13 or the Internet 14.

The check table format data is used to receive selection of the status information type to be transmitted to the management device 11 and/or server 12. As shown in FIG. 5, the check table format data includes letters "export" and multiple items such as "printer information," "printer condition," and "CTG lifetime information" to be displayed below the letters "export." The check table format data includes sub-items such as "model name" and "main body serial number" that are to be displayed below the item "printer information." Further, the check table format data also includes letters of "notification options 1" and "notification options 2" which are displayed on the right side with respect to the letters "export." The letters "notification options 1" indicates the administrator of the printer 10. The letters "notification options 2" indicates the service provider. The check table format data has a plurality of check boxes that are displayed at positions below the "notification options 1" and on the right of the item "printer information" and other items, and the sub-item "model name" and other sub-items. Further, the check table format data has a plurality of check boxes that are displayed below the "notification options 2" and on the right of the item "printer information" and other items, and the sub-item "model name" and other sub-items. The check boxes below the "notification options 1" are used to indicate instructions from the administrator of the printer 10 as to whether or not to output the status information of the items and sub-items displayed on the left of the check boxes. The check boxes below the "notification options 2" are used to indicate instructions from the service provider as to whether or not to output the status information of the items and sub-items displayed on the left of the check boxes. As shown in the example of FIG. 5, the check box displayed on the right of the sub-item "model name" and below the "notification options 1" is checked. That means the status information of "model name" is to be transmitted to the management device 11.

The check table format data has fields to be displayed between the items and the check boxes and between the sub-items and the check boxes. Each field is given the same field name as the name of the item or the sub-item displayed on the left of each field. The controller 51 is configured to read the status information, associated with the same name as the field name, stored in the EEPROM 57 and enter the status information into the field for generating the check table image data based on the check table format data. The check table image data also includes a script for receiving checks of the check boxes.

Hereinafter, the process executed according to the control program 59 will be described. In the following description, it may be described that the controller 51 having the CPU 52 executes the control program 59.

First, processes that the controller 51 determines whether the printer 10 is used in the first mode or the second mode will be described. The controller 51 reads the contract mode value from the IC memory 17 through the cartridge I/F 49 in response to the cartridge 15 being received in the mounting case 32 or in response to the printer 10 being turned on. When the controller 51 determines that the read contract mode value is "1," the controller 51 determines that the printer 10 is used in the first mode. When the contract mode value read is "0," the controller 51 determines that the printer 10 is used in the second mode. The controller 51 then stores contract mode information indicating the determined first mode or second mode in a particular area in the EEPROM 57. The contract mode value read from the IC memory 17 is an example of usage type information. The contract mode information is an example of output determination information. It is noted that the controller 51 may determine whether the printer 10 is used in the first mode or the second mode in other methods.

Figure 6:
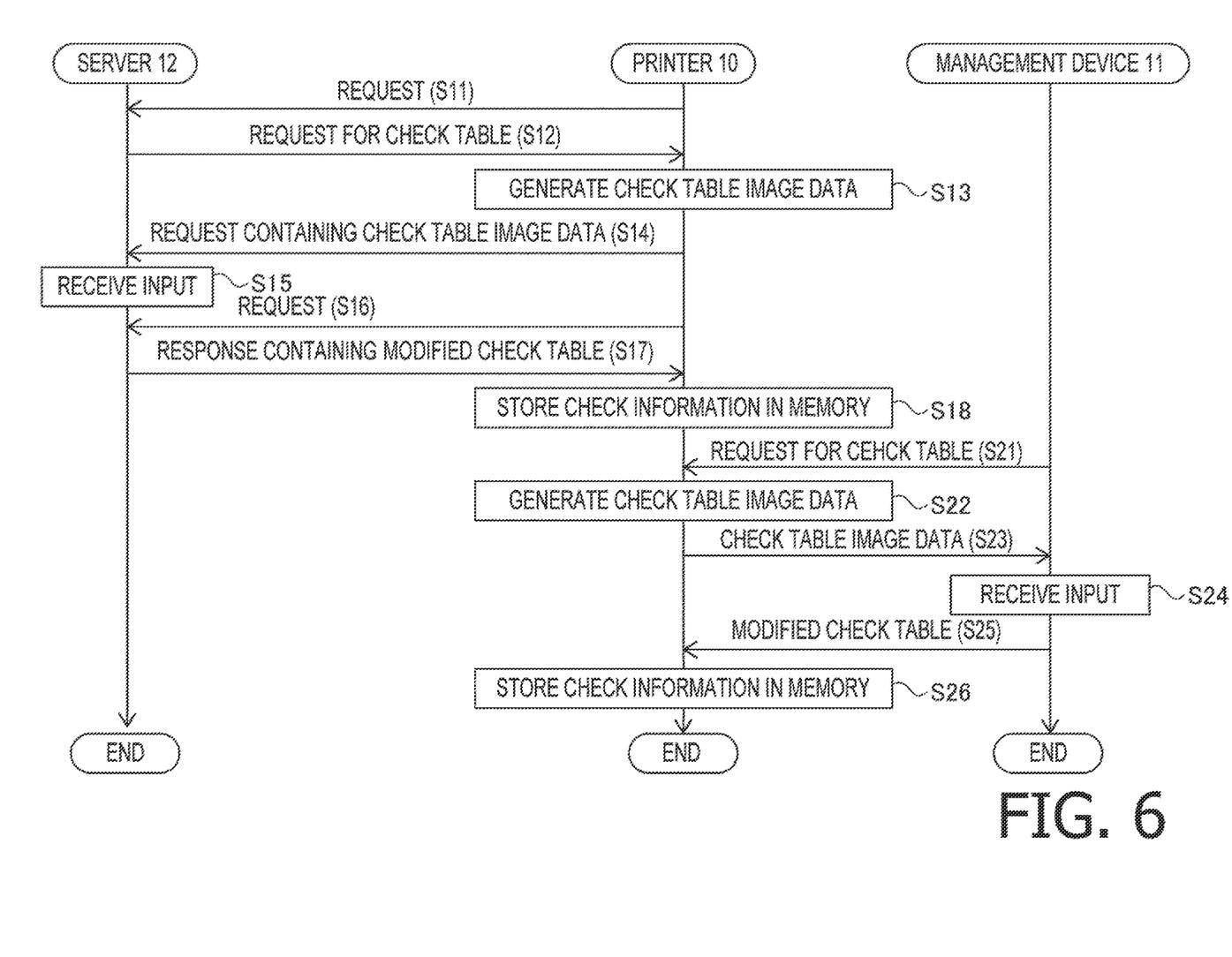
FIG. 6 shows a process that the printer receives from a service provider or an administrator instructions to designate a status information type to be output.

Next, processes that the controller 51 generates the check table image data and receives instructions from the administrator or the service provider with use of the generated check table image data will be described with reference to FIG. 6. In response to determining that the printer 10 is used in the first mode, the controller 51 executes so-called polling in order to receive instructions from the server 12. In detail, the controller 51 periodically transmits a request in compliance with the HTTP communication protocol to a URL of the server 12 stored in the EEPROM 57, through the communication IF 47 (S11).

The server 12 executes a program to receive the request and transmit a response, in compliance with the HTTP communication protocol containing a command for requesting a check table, to the printer 10 through the Internet 14 and the local network 13 (S12). The controller 51 receives the response from the server 12 through the communication I/F 47 (S12). The controller 51 generates the check table image data according to the commands contained in the received response (S13). The controller 51 transmits a request, in compliance with the HTTP communication protocol, containing the generated check table image data to the server 12 through the communication I/F 47 (S14). The server 12 receives the request from the printer 10 (S14), displays on a display of the server 12, the check table shown in FIG. 5 indicated by the check table image data included in the received request, and receives an input from the service provider (S15). The server 12 updates status of check boxes in the check table according to the received input, and waits until receiving a request transmitted from the printer 10. Then, in response to receiving the request transmitted from the printer 10 (S16), the server 12 generates a response including a modified check table with the updated status of check boxes. The server 12 transmits the generated response to the printer 10 through the Internet 14 and the local network 13 (S17). The controller 51 receives the response transmitted by the server 12 (S17), and obtains the check table with the updated status of check boxes contained in the received response. The controller 51 stores in the EEPROM 57 check information indicating each check box in the obtained check table is checked or not (S18). In response to determining that the printer 10 is used in the second mode, the controller 51 skips the processes of S11, S12, S13, S14, S15, S16, S17 and S18.

The controller 51 receives from the management device 11 a request including a command to request the check table, through the local network 13 and the communication I/F 47 (S21). In response to receiving the request, the controller 51 generates check table image data (S22) and transmits the generated check table image data to the management device 11 through the communication I/F 47 and the local network 13 (S23). When the management device 11 receives the check table image data, the management device 11 displays the check table indicated by the check table image data on the display of the management device 11, and receives input from the administrator (S24). The management device 11 updates status of check boxes in the check table according to the received input, and generates a modified check table. The management device 11 transmits the generated modified check table to the printer 10 through the local network 13 (S25). The controller 51 receives the modified check table transmitted by the management device 11 through the communication I/F 47 (S25), and stores in the EEPROM 57 the check information indicating each check box in the received modified check table is checked or not (S26). The controller 51 may receive the inputs of the service provider or the administrator in other processes than the above-described processes.

Figure 7:
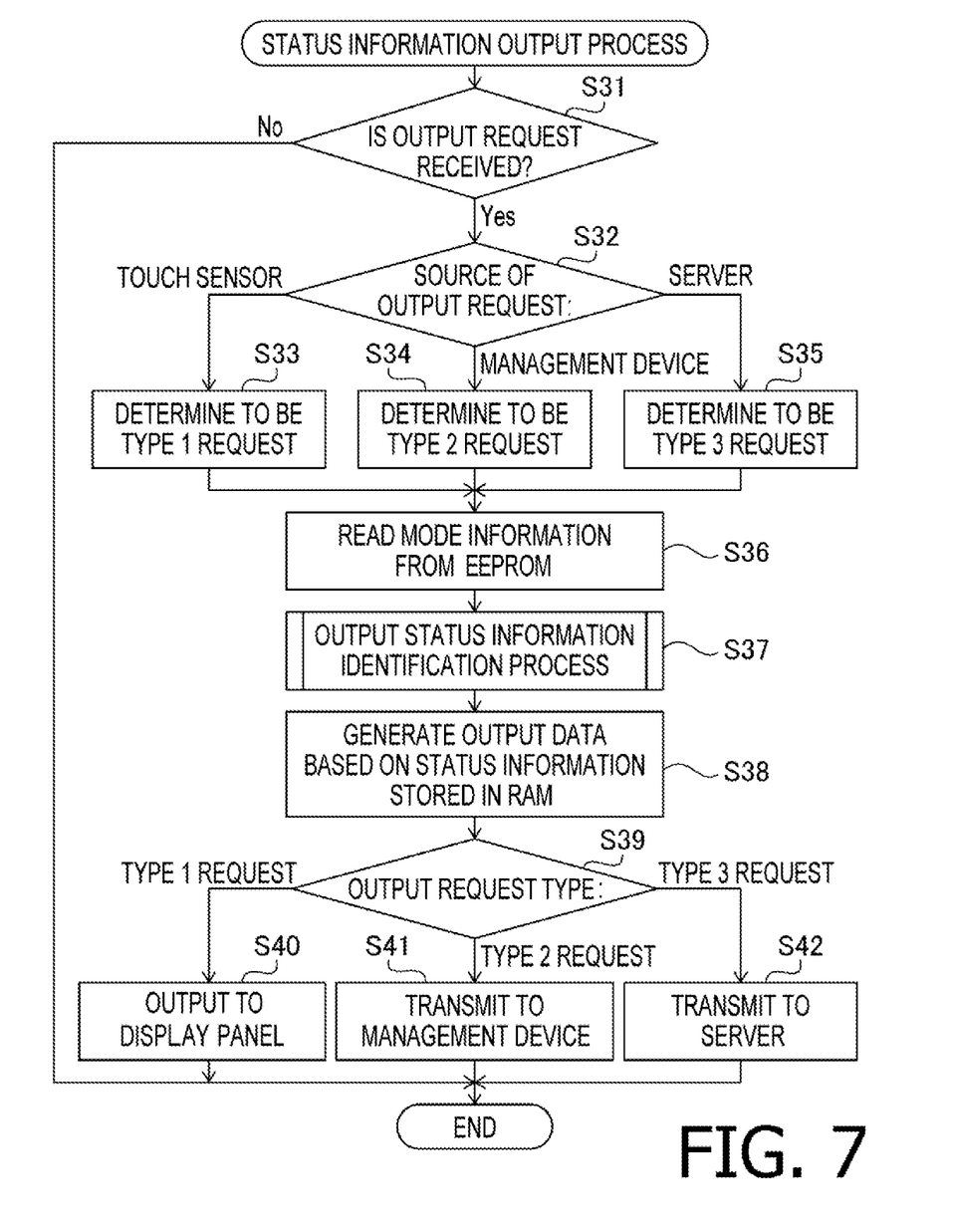
FIG. 7 is a flowchart illustrating a status information output process.

Next, a status information output process that the controller 51 transmits the status information stored in the EEPROM 57 to the server 12, the management device 11, and the display panel 43 will be described with reference to FIGS. 6 and 7. The controller 51 determines whether an output request for outputting the status information has been received. The output request is transmitted from the server 12, the management device 11, or the touch sensor 44. In detail, the server 12 transmits a response including the output request through the Internet 14 and the local network 13 in the same manner as in S12. The controller 51 receives the response including the output request through the communication I/F 47 (S31: YES). Further, the management device 11 transmits the output request to the printer 10 through the local network 13. The controller 51 receives the output request transmitted by the management device 11 through the local network 13 and the communication I/F 47 (S31: YES). The user may touch the touch sensor 44 to input the output request to the printer 10. The controller 51 receives the output request from the touch sensor 44 (S31: YES). When the controller 51 does not receive the output request (S31: NO), the controller 51 terminates the status information output process. The controller 51 executes the status information output process periodically.

The controller 51 determines that a source of the output request is the server 12, the management device 11, or the touch sensor 44 (S32). The controller 51 determines that the output request is from the server 12 based on that an IP address of the server 12 is included in the HTTP response containing the output request (S32: SERVER). Based on that an IP address of the management device 11 is included in the received output request, the controller 51 determines that the output request is from the management device 11 (S32: MANAGEMENT DEVICE).

When the controller 51 determines that the output request is from the touch sensor 44 (S32: TOUCH SENSOR), the controller 51 determines the output request type to be the type 1 request (S33). When the controller 51 determines that the output request is from the management device 11 (S32: MANAGEMENT DEVICE), the controller 51 determines the output request type to be the type 2 request (S34). When the controller 51 determines that the output request is from the server 12 (S32: SERVER), the controller 51 determines the output request type to be the type 3 request (S35). After determining the output request type in S33, S34 and S35, the controller 51 reads the contract mode information stored in the EEPROM 57 (S36). The controller 51 executes an output status information identification process (S37) to identify the status information type to be output based on the determined output request type and the read contract mode information. It is noted that information indicating the source of the output request is an example of request type information.

Figure 8:
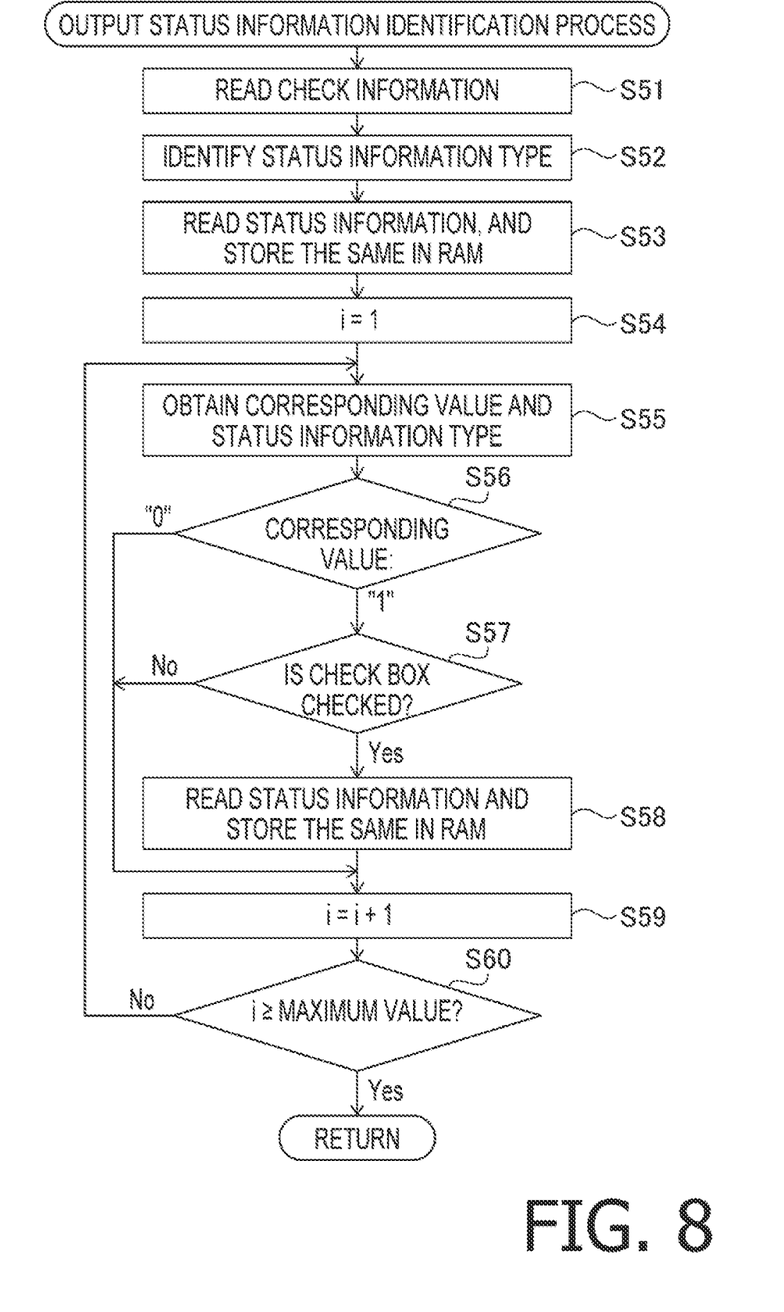
FIG. 8 is a flowchart illustrating an output status information identification process.

The output status information identification process in S37 is described with reference to FIG. 8. First, the controller 51 reads the check information that is stored in the EEPROM 57 in S18 or S26 (S51). The controller 51 identifies the status information type to be output based on the read check information and the output request type that is determined in S33, S34, or S35 (552). When the determined output request type is the type 1 request, i.e., Notification Options 1 and the check box corresponding to the sub-item "Total" of the item "Sheet count per paper type" is checked in the check table as shown in FIG. 5, the controller 51 identifies "total number of printed sheets per paper type" as the status information type to be output. The controller 51 reads the status information indicated by the identified status information type from the EEPROM 57, and stores the read status information in the RAM 56 (S53).

Next, the controller 51 sets an initial value "1" in a variable "i" stored in a particular storage area of the EEPROM 57 (S54). In the correspondence table, the controller 51 identifies the record having "1", which is the current value of the variable "i", in the item "number". In the identified record, the controller 51 obtains an information output value, i.e., "0" or "1", corresponding to the output request type determined in S33, S34 or S35 and the contract mode information read from the EEPROM 57 in S36 (S55). When the determined output request type is the type 1 request and the contract mode information read from the EEPROM 57 indicates the first mode, the controller 51 obtains the information output value "1." In addition, the controller 51 obtains the status information type "printer information" registered in the identified record. The controller 51 determines whether the obtained information output value is "1" or "0" (S56). When the controller 51 determines that the obtained information output value is "1" (S56: "1"), the controller 51 determines whether the check information contains information indicating that the check box corresponding to the status information type "printer information" is checked (S57). When the controller 51 determines that the check box corresponding to the status information type "printer information" is checked (S57: YES), the controller 51 reads the status information of the status information type "printer information" from the EEPROM 57, and stores the read status information in the RAM 56 (S58). When the controller 51 determines that the obtained information output value is "0" in S56 (S56: "0"), the controller 51 skips the processes S57 and S58. When the controller 51 determines that the check box corresponding to the status information type "printer information" is not checked (S57: NO), the controller 51 skips the process S58.

Next, the controller 51 increments the value of the variable "i" by one (S59) and determines whether the incremented value of the variable "i" is greater than or equal to the maximum value stored in the memory 53 (S60). The maximum value is a number of records registered in the correspondence table and is stored in the EEPROM 57. That is, in S60, it is determined whether or not all the records registered in the correspondence table have been determined to be status information to be output. When the controller 51 determines that the value of the variable "i" is less than the maximum value (S60: NO), the controller 51 executes the process S55 again. When the controller 51 determines that the value of the variable "i" is greater than or equal to the maximum value (S60: YES), the controller 51 terminates the output status information identification process and executes the process S38 of the status information output process shown in FIG. 7.

The controller 51 generates output data including the status information stored in the RAM 56 in S58 (S38). Then, the controller 51 determines a destination of the generated output data based on the output request type (S39), and transmits the generated output data to the determined destination. When the controller 51 determines that the output request type is the type 1 request (S39: "type 1 request"), the controller 51 outputs the generated output data to the display panel 43 (S40). That is, the controller 51 causes the display panel 43 to display the status information stored in the RAM 56. When the controller 51 determines that the output request type is the type 2 request (S39: "type 2 request"), the controller 51 transmits the generated output data to the management device 11 through the local network 13 (S41). The management device 11 receives the output data and displays the status information contained in the received output data on the display of the management device 11. When the controller 51 determines that the output request type is the type 3 request (S39: "type 3 request"), the controller 51 generates a request, in compliance with the HTTP communication protocol, containing the generated output data. The controller 51 transmits the generated request to the server 12 through the communication I/F 47 (S42). The server 12 receives the request containing the output data and displays the status information contained in the received output data on the display of the server 12. The controller 51 terminates the status information output process in response to transmission of the output data to the display panel 43, the management device 11, or the server 12.

Effect of the Embodiment

The controller 51 identifies the status information type based on the determined output request type, the mode indicated by the contract mode information, and the correspondence table stored in the EEPROM 57 among the plurality of status information stored in the EEPROM 57. Then, the controller 51 reads the status information indicated by the identified status information type from the EEPROM 57 and outputs the read status information. Thus, the controller 51 determines the status information type to be output according to the requester information and the contact mode information. For example, when the IC memory 17 of the cartridge 15 mounted in the mounting case 32 stores a value representing the contracted usage mode, i.e., the first mode, and the output request type is the type 1 request (user), the user may not be interested in the status information type such as the CTG lifetime information, the pad lifetime information, and the CTG coverage information. The user may also have some difficulties to recognize what information on the display panel 43 is important for the user if such status information type is displayed together. The controller 51 also determines in the correspondence table the status information type proper for a requester making the output request, and outputs the status information associated with the determined status information type. Therefore, the controller 51 may help the requester making the output request recognize the status information required by the requester.

Further, the controller 51 transmits the check table image data to the management device 11 or the server 12, receives the check information indicating the instructions of the administrator or the service provider, and obtains the status information type to be output based on the received check information (S55). Thus, the administrator or service provider may have privileges to select the status information type to be output.

Modifications

In the above-described embodiment, the controller 51 determines the type 2 request based on that the IP address included in the output request. However, the controller 51 may determine the type 2 request based on that the output request, received through the communication I/F 47, includes an administrator account. If the output request does not include the administrator account, the controller 51 determines that the output request is the type 1 request. When the controller 51 receives an output request transmitted from another management device different from the management device 11 operated by the administrator, the controller 51 determines whether the received output request includes the administrator account. The administrator information is an example of the request type information.

In the above-described embodiment, the controller 51 determines the type 1 request based on that the output request is from the touch sensor 44. However, if the output request from the touch sensor 44 includes the administrator account, the controller 51 may determine that the output request is the type 2 request. In that case, if the output request from the touch sensor 44 does not include the administrator account, the controller 51 determines that the output request is the type 1 request. The administrator information is an example of the request type information.

In the above-described embodiment, the controller 51 determines the type 3 request based on that the controller 51 has received a response, that includes the output request, including the IP address of the server 12. However, the controller 51 may determine that the output request type is the type 3 request based on the fact that the received output request includes service provider information such as an account indicating the service provider.

In the above-described embodiment, though, in a record containing a particular status information type, the information output value "1" is registered in the field, the status information is not transmitted to the management device 11 or the server 12 if not checked in a check box of the check table. However, as far as, in a record containing a particular status information type, the information output value "1" is registered in the field, the status information may be transmitted to the management device 11 or the server 12 regardless the check box in the check table.

In the above-described embodiment, the controller 51 outputs the output data to the display panel 43 when the controller 51 determines the type 1 request. However, when the controller 51 determines the type 1 request, the controller 51 may output the output data to drive the recording engine 40 to record the status information included in the output data on the sheet. Alternatively, the controller 51 may output the output data to drive the recording engine 40 to record the status information on the sheet in response to determining that the received output request includes an instruction to record the status information on the sheet.

In the above-described embodiment, the controller 51 transmits a request including the output data to the server 12 in S42. However, the controller 51 may, instead of or together with the process in S42, send an e-mail containing the output data to an e-mail address of the service provider.

What is claimed is:

1. An image recording device, comprising:
    a mounting part to which a cartridge is mounted;
    a printing head configured to perform printing on a sheet;
    a cartridge interface;
    an information interface;
    a memory; and
    a controller,
    wherein the memory is configured to store correspondence information associating a plurality of types of status information, output determination information and request type information with each other,
    wherein the status information is related to at least one of information on the cartridge mounted in the mounting part and information corresponding to operation of the printing head, the status information being stored in the memory by the controller,
    wherein the output determination information corresponds to usage type information obtained from a cartridge memory through the cartridge interface, the cartridge memory being provided to the cartridge mounted in the mounting part,
    wherein the request type information indicates a type of a transmitting source requesting the status information, and
    wherein the controller is configured to perform:
        receiving an output request that requests output of the status information;
        determining a type of the request type information based on the transmitting source of the output request; and
        identifying the status information of which type is associated with the determined request type information and the output determination information corresponding to the obtained usage type information, the status information being identified based on the correspondence information from among a plurality of the status information types stored in the memory.

2. The image recording device according to claim 1, further comprising a display panel,
    wherein the information interface includes a user interface and a communication interface, and
    wherein the controller is configured to perform:
        in response to receipt of the output request through the user interface, determining the request type information is a type 1 request;
        in response to receipt of the output request from a management device connected to a local network to which the communication interface is connected, determining that the request type information is a type 2 request;
        in response to receipt of the output request from an information processing device through the communication interface and the Internet, determining that the request type information is a type 3 request;
        in response to determination of the type 1 request, outputting the identified status information on one of the display panel and the printing head, the display panel being configured to display the identified status information when receiving the identified status information, the printing head being configured to print the identified status information when receiving the identified status information;
        in response to determination of the type 2 request, outputting the identified status information to one of the printing head and the management device; and
        in response to determination of the type 3 request, outputting the identified status information to the information processing device through the communication interface.

3. The image recording device according to claim 2, wherein the controller is configured to perform:
    receiving, from among the identified status information, one of selections of outputting and not outputting; and
    outputting only the status information for which the selection of outputting is received.

4. The image recording device according to claim 1, wherein the status information includes cartridge lifetime information stored in the memory by the controller, the cartridge lifetime information indicating lifetime of the cartridge mounted in the mounting part, and
    wherein whether to output or not the cartridge lifetime information depends on the type of the request type information and the type of the output determination information.

5. The image recording device according to claim 1, further comprising:
    a pump configured to discharge ink from the printing head which is configured to eject the ink contained in the cartridge mounted in the mounting part; and
    a maintenance device provided with a pad configured to hold the ink discharged from the printing head,
    wherein the status information includes pad lifetime information stored in the memory by the controller, the pad lifetime information corresponding to an amount of the ink held by the pad, and
    wherein whether or not the pad lifetime information is to be output depends on the type of the request type information and the type of the output determination information.

6. The image recording device according to claim 1, wherein the status information includes coverage information stored in the memory by the controller, the coverage information indicating an occupancy rate of a consumable stored by the cartridge mounted in the mounting part, and wherein whether or not the coverage information is to be output depends on the type of the request type information and the type of the output determination information.

7. The image recording device according to claim 1, wherein the status information includes page count information stored in the memory by the controller, the page count information corresponding to a number of sheets on which the printing head performed recording, and wherein whether or not the page count information is to be output depends on the type of the request type information and the type of the output determination information.

8. The image recording device according to claim 1, wherein the status information includes cartridge identification information obtained, by the controller, from the cartridge memory through the cartridge interface, the cartridge identification information identifying the cartridge mounted in the mounting part, and wherein whether or not the cartridge identification information is to be output depends on the type of the request type information and the type of the output determination information.

9. The image recording device according to claim 4, wherein the status information contains at least one of:

state information which is information indicating a state of a recording part including the printing head;

main body identification information which is stored in the memory in advance; and replacement count information indicating a number of times the cartridge has been replaced, and stored in the memory by the controller.

\* \* \* \* \*